A. M. MacFARLAND.
LABELING MACHINE.
APPLICATION FILED MAY 13, 1915.

1,294,290.

Patented Feb. 11, 1919.
7 SHEETS—SHEET 1.

Fig. 1.

Witnesses:—
A. L. McKee.
A. S. Dimond.

Inventor
A. Mason MacFarland,
by Wilhelm Parker,
Attorneys.

A. M. MacFARLAND.
LABELING MACHINE.
APPLICATION FILED MAY 13, 1915.

1,294,290.

Patented Feb. 11, 1919.
7 SHEETS—SHEET 6.

Witnesses:—
A. D. McGee.
A. G. Dimond.

Inventor
A. Mason MacFarland,
by Wilhelm Parker,
Attorneys.

UNITED STATES PATENT OFFICE.

ALLISON MASON MacFARLAND, OF BUFFALO, NEW YORK, ASSIGNOR OF ONE-HALF TO HERMAN BERNHARDT, OF BUFFALO, NEW YORK.

LABELING-MACHINE.

1,294,290.  Specification of Letters Patent.  Patented Feb. 11, 1919.

Application filed May 13, 1915. Serial No. 27,785.

*To all whom it may concern:*

Be it known that I, ALLISON MASON MAC-FARLAND, a citizen of the United States, residing at Buffalo, in the county of Erie and State of New York, have invented a new and useful Improvement in Labeling-Machines, of which the following is a specification.

This invention relates to machines for applying labels to bottles, packages or the like.

The object of the invention is to provide a labeling machine occupying a relatively small amount of floor space, which is constructed to operate successfully at a high rate of speed with the minimum amount of attention, so that the cost of applying labels to articles is materially reduced.

The machine shown, which embodies this invention, includes a traveling conveyer for the articles to be labeled, a number of label magazines, label carriers adapted to receive glue, to take labels from the magazines and to carry the labels into operative relation to the articles, presser fingers for holding the labels on the articles, and means for brushing or smoothing the labels on the articles.

With this object in view the invention aims to improve machines of this kind in the following respects:

By eliminating as far as possible all reciprocatory parts and causing the label carriers to move continuously in one direction; also by causing the label magazines to move continuously in one direction during a part of which movement they travel in operative relation to the carriers and at substantially the same speed as the carriers; also by providing a plurality of label magazines and label carriers which successively pass through their various operations so that the speed of the machine is not limited by the time required for a carrier to remove a label from a magazine; also by improving the means for feeding the articles to be labeled to the labeling devices; also by providing means of improved construction for transferring the labels from the carriers to the articles and for holding the same on the articles; also by providing means of improved construction for brushing or pressing the labels against the articles; also by improving the construction of the label magazines; also by providing means of improved construction for applying the glue to the carriers; also by providing means for preventing a carrier from taking a label from a magazine if no article is fed to the labeling device for the carrier; also by improving the construction of machines of this kind in the respects hereinafter specified.

The machine shown in the drawings is designed particularly for the purpose of applying labels to bottles, and the articles to be labeled will hereinafter be referred to as "bottles". It is not, however, intended thereby to limit the use of the machine to labeling bottles since the machine can readily be adapted for applying labels on other articles.

Briefly stated, the machine disclosed in the drawings comprises a traveling conveyer having parts on which the bottles are placed and which moves the bottles into operative relation to the labeling mechanism which applies the labels while the bottles are in motion. The labeling mechanism comprises a plurality of magazines which are movably mounted, and a plurality of label pickers or carriers movable past and receiving glue from a gluing device, then moving for a distance in proximity to and at the same speed as the label magazines for taking labels from the magazines, and then carrying the labels into operative relation to the bottles. The label magazines and the label carriers are so arranged that coöperating label magazines and pickers move successively into and out of operative relation. The labels are taken from the carriers and held on the bottles by means of holding devices or presser fingers moving in the same direction and at the same speed as the bottles and which press the labels against the bottles until the same have moved past the brushing mechanism, after which the presser fingers release the bottles, which are then discharged from the machine. From the labeling mechanism the bottles pass to the brushing mechanism, by means of which the labels are pressed or flattened against the bottles, after which the conveyer discharges the bottles from the machine.

The supporting frame on which the parts of the machine are mounted may be of any suitable construction, not shown in drawings including a plurality of longitudinal and transverse horizontal members or bars 24 and 25 supported on legs 26, and an upright extension or part 27 secured to the horizontal members of the frame. 30 represents the conveyer which carries the bottles to the labeling mechanism and which consists of two endless chains or belts extending longitudinally of the machine and passing over driving sprocket wheels 31 located at the discharge end of the machine, and sprocket wheels 32 journaled in bearings 33 adjacent to the other end of the frame. The two chains are connected by spacing bars or pins 34 which extend across the space between the chains and the opposite ends of which form pivots which connect adjacent links of the chains, so that the two chains and the spacing bars form a substantially unitary belt or conveyer. Anti-friction rollers or wheels 35 are pivoted on the spacing bars 34 and are adapted to enter into recesses or depressions 36 on the sprocket wheels and to run on tracks 37 mounted on the frame of the machine to support the upper run of the conveyer. The conveyer is provided with cradles, receptacles or trough-shaped portions 38 adapted to receive the bottles 39. A conveyer of other suitable construction can be employed if desired.

The labeling magazines and the mechanisms for gumming the labels and placing the same into operation relation to the bottles, as shown, are arranged above the conveyer 30 on the upwardly extending portion 27 of the frame. 40 represents a magazine supporting frame or member which may be of any suitable construction and which is rotatably mounted on the extension 27 on the frame and carries the label magazines. The frame 40, shown in the drawings, is substantially rectangular in shape, being open at one side and having four flat peripheral faces on which the label magazines are mounted and which are arranged about a central hub 41. Each of the magazines comprises a plurality of holding fingers or posts 42 secured on the frame 40 and extending outwardly from the flat faces thereof. The fingers are so arranged that a plurality of labels can be placed between the same, and the ends of the fingers are provided with inwardly extending hooks or projections 43 which resist the removal of the labels 44 beyond the ends of the fingers.

Each label magazine is provided with means for feeding the labels to the outer ends of the magazines from which they are taken by the carriers. The means shown for this purpose comprise a gravity-actuated follower 45 and a pawl and ratchet mechanism for holding the follower and labels from moving inwardly from their outer positions. The follower 45 is slidably arranged between the label holding fingers, and is provided with a toothed bar 46, Figs. 9–12, extending through a hole in the peripheral portion of the label magazine frame. The toothed bar is adapted to be engaged by means of a pawl 47 pivoted on the magazine frame 40 and yieldingly held in engagement with the toothed bar 46 by means of a spring 48. The followers are preferably made fairly heavy, so that when the label magazines during the rotation of the magazine frame are in their lower or inverted position in which the followers rest upon the labels, the weight of the followers will move the labels toward the outer ends of the holding fingers. The pawls engaging the toothed bars of the followers prevent the same from again moving inwardly when the magazines are in their upright position. In order to release the follower for filling the magazines with labels, each pawl is provided with a link 49 by means of which the pawl can be swung on its pivot out of engagement with the toothed bar 46.

The magazine frame is mounted on a shaft 50 and is rotated about the axis thereof when the machine is in operation. In order to facilitate the filling of the magazines and to avoid delay in the operation of the machine while filling the magazines, the magazine frame 40 is removably mounted on the frame 50 by any suitable means, so that the magazine frame can be readily removed from the shaft and replaced by another magazine frame. For this purpose, in the construction shown, the shaft 50 is provided with a nut 51 engaging a threaded part on the shaft and the hub 41 of the magazine holder is splined on the shaft 50 so that by removing the nut 51 the magazine holder can be easily removed from the shaft.

Figures 10, 11, 12:
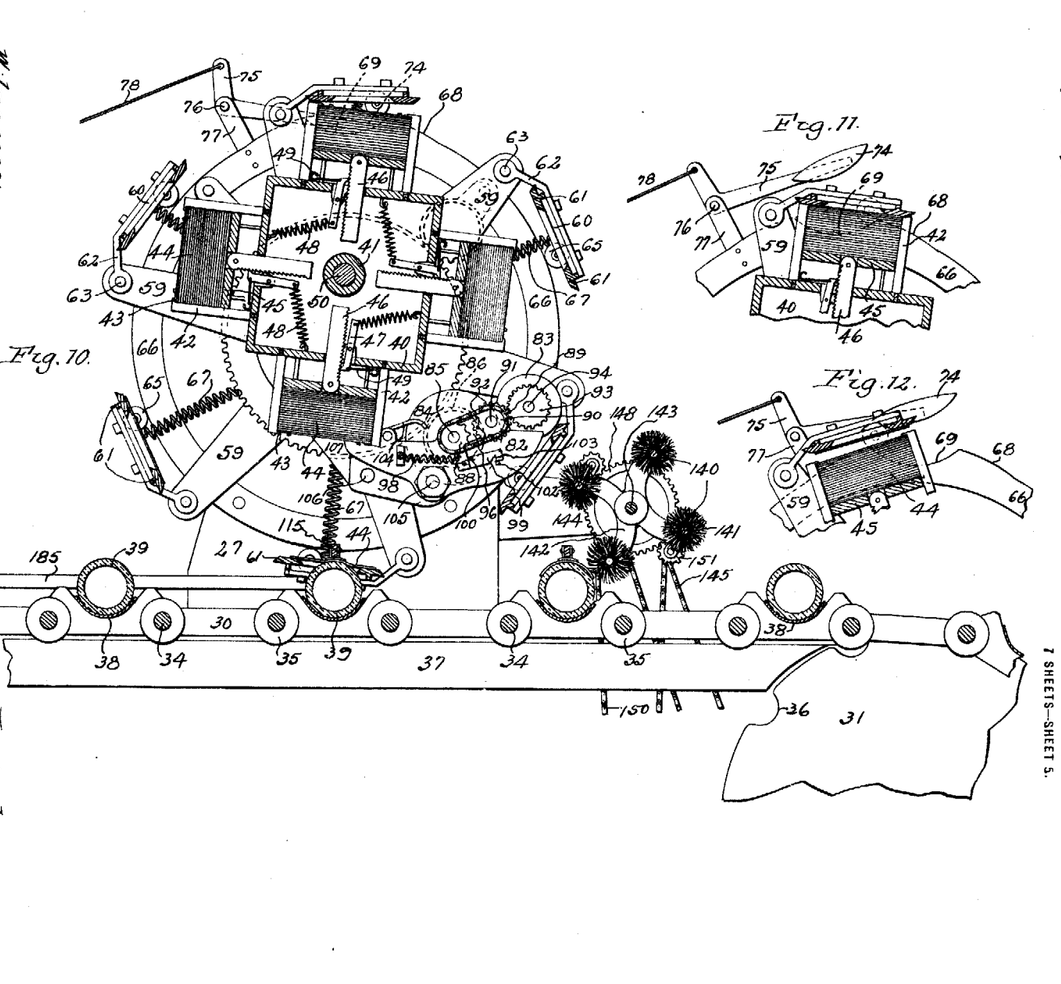
Fig. 10 is a fragmentary longitudinal sectional elevation thereof on line 10—10, Fig. 2, on an enlarged scale.
Figs. 11 and 12 are fragmentary sectional elevations showing the labeling magazines and pickers in different positions.

The label magazines and the label pickers or carriers for taking the labels from the magazines are so arranged relatively to each other that the label carriers during a part of their movement are in engagement with the labels while traveling at substantially the same speed as the magazines, and the magazines and carriers are then separated gradually so as to prevent the formation of a partial vacuum between the labels which would resist the removal of one label from the others if the labels were separated too suddenly. In the construction shown for this purpose, both the label magazines and label carriers move in substantially circular paths arranged eccentrically with regard to each other. The shaft 50 on which the label magazines are mounted is journaled eccentrically in a bearing boss or projection 55 secured on the frame extension 40 by any suitable means, such as screws 56, which hold the boss against turning relatively to the frame of the machine. A rotatable sleeve 57 is journaled on the boss 55 and is provided with a gear 58 by means of which the sleeve is rotated and with a plurality of outwardly extending arms 59, near the outer ends of which the label pickers or carriers are mounted, six label carriers being employed in the construction shown. 60 represents the label pickers or carriers, which may be of any suitable construction, depending upon the size or nature of the labels used and upon what part of the surface of the labels which is to be glued. The machine shown in the drawings is adapted to apply glue only to the end portions of the labels. For this reason the label carriers are bifurcated and comprise two arms 61 which are adapted to receive the glue and to take the labels from the magazines, and an arm 62 extending to one side of the arms 61 and the end of which is pivoted at 63 on one of the arms 59 so that the carriers can swing toward and from the label magazines. The pickers or carriers are provided with wheels or rollers 65 which travel on a cam track 66 suitably secured on the extension 27 of the frame of the machine. Springs 67, each connected at one end to the picker or carrier and at the other end to the rotatable sleeve 57, yieldingly hold the wheels or rollers of the carriers in engagement with the cam track. At the point where the path of movement of the carriers approaches the path of movement of the label magazines the cam track 66 is provided with an inclined portion 68 which moves the carriers away from the label magazines, and with a depression or recessed part 69 which permits the carriers to be moved into engagement with the outermost label in the magazines by the spring 67, as shown in Fig. 11. In moving out of the depressed portion 69 of the cam track the pickers or carriers are again withdrawn from the label magazines and carry the labels downwardly to the bottles.

Figure 1:
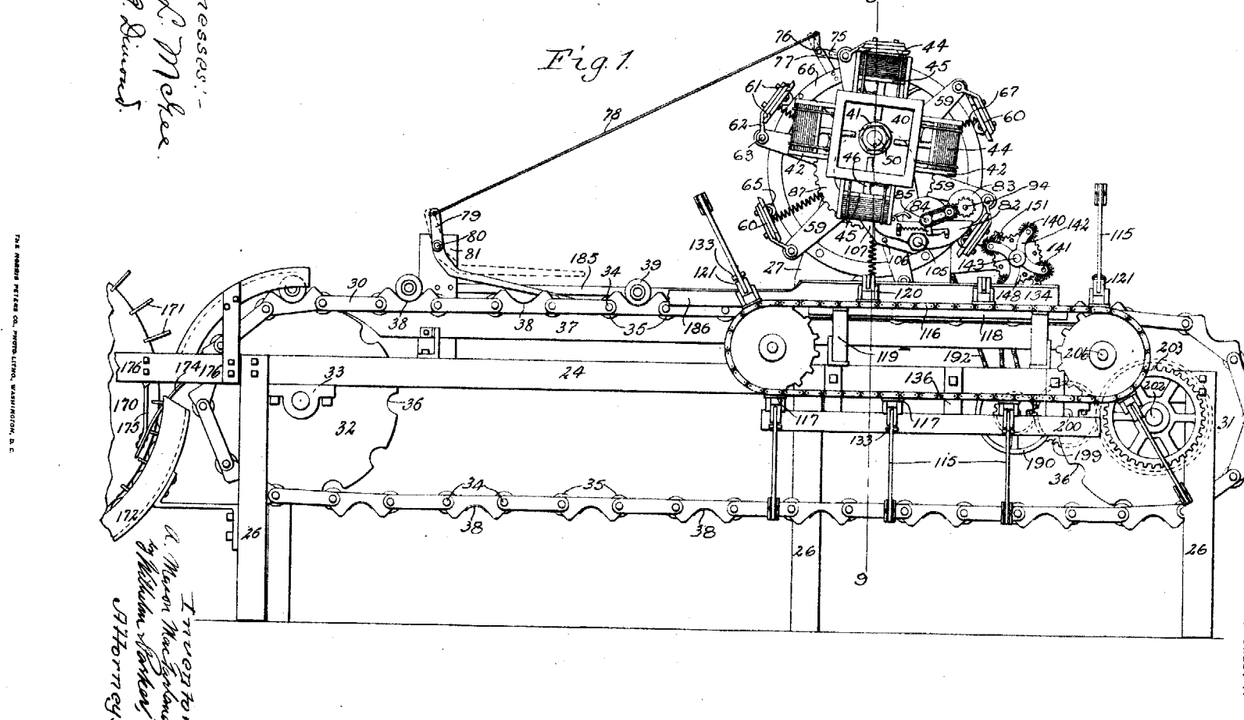
Figure 1 is a side elevation of a labeling machine embodying the invention, a part of the feed mechanism being broken away.

It is desirable to provide means for preventing the carriers from taking labels from the magazines if not bottles are carried by the conveyer 30 to the labeling devices. In the construction shown for this purpose a cam segment 74 is provided which is adapted to enter into the depressed portion 69 of the cam track so that the roller 65 of the carrier travels over the upper face of the segment 74 when the same is in the depression 69 in the cam track, as shown in Fig. 10. This cam segment is mounted on a lever 75 pivoted at 76 on an arm or extension 77 secured, in the construction shown, on the cam track. The segment is adapted to be moved into and out of the depression in the track by swinging the lever about its pivot. This is accomplished by means of a cord or link 78 connected at one end to the lever 75 and at the other end to one arm of a lever 79 pivoted at 80 on an upwardly projecting part or bracket 81 on the frame of the machine. The other arm of the lever 79 extends into operative relation to the bottles carried by the conveyer 30. The levers 75 and 79 normally drop by gravity into the positions shown in full lines on Fig. 1, so that the segment 74 rests in the depression 69 in the cam track and prevents the carriers from taking labels from the magazines. When, however, the lever is engaged by a bottle on the conveyer it is moved into the position shown in dotted lines in Fig. 1 and moves the segment 74 out of the depression in the cam track so that a label is taken by the carrier, the wheel of the roller 65 of which passes into the depression in the track. Each cradle 38 of the conveyer reaches the lever 79 just before the carrier corresponding to the cradle reaches the depression 69 of the cam, so that if the cradle contains a bottle, the carrier will be caused to take up a label and then apply the label to the same bottle which caused the carrier to take up the label. By means of this construction the carriers do not take any labels from the magazines unless there are bottles on the conveyer on which the labels are to be placed.

Figures 5, 6, 7, 8:
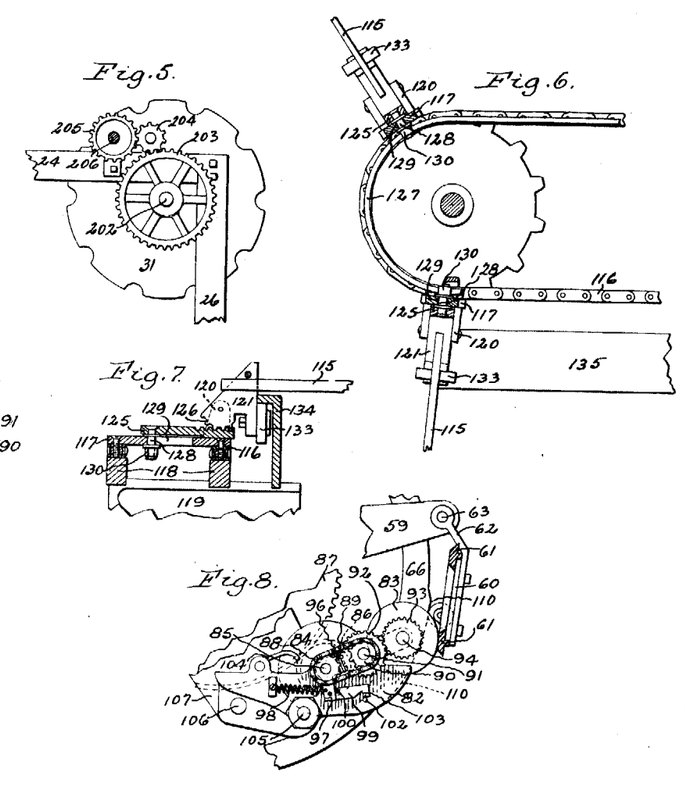
Fig. 5 is a fragmentary sectional elevation thereof on line 5—5, Fig. 4, showing the means for driving the presser fingers which hold the labels on the articles.
Fig. 6 is a fragmentary sectional elevation thereof on line 6—6, Fig. 2, on an enlarged scale, showing a part of the actuating means for the presser fingers.
Fig. 7 is a fragmentary transverse sectional elevation thereof on line 7—7, Fig. 2, on an enlarged scale, showing the actuating mechanism for one of the presser fingers.
Fig. 8 is a fragmentary elevation thereof on an enlarged scale, showing the gluing mechanism.
Figure 9:
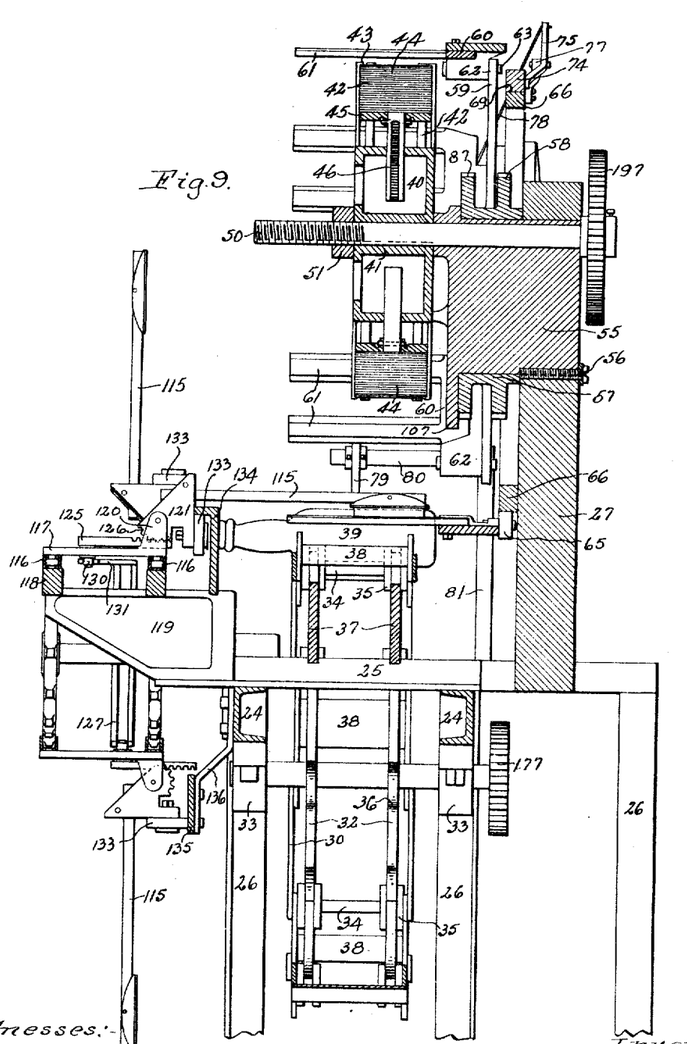
Fig. 9 is a fragmentary transverse sectional elevation of the machine on line 9—9, Fig. 1, on an enlarged scale.
Figure 13:
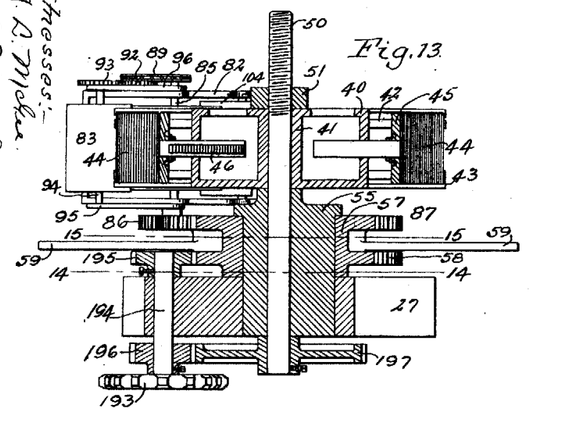
Fig. 13 is a sectional plan view of the machine on line 13—13, Fig. 3, on an enlarged scale.
Figure 14:
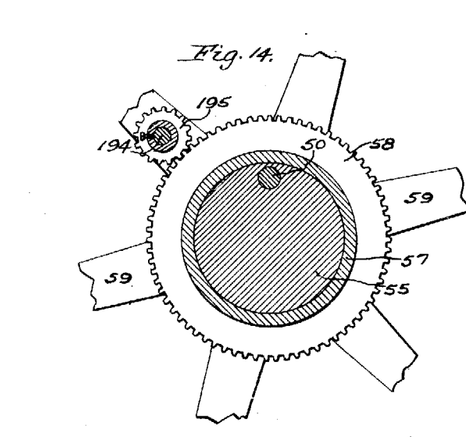
Figs. 14 and 15 are sectional elevations respectively on lines 14—14 and 15—15, Fig. 13.
Figure 15:
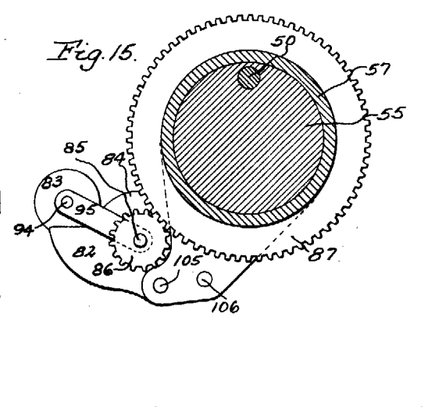

The faces of the arms 61 of the carriers which engage the labels are coated with glue or other adhesive before taking labels from the magazines. The glue enables the carriers to take the labels from the magazines as well as to secure the labels to the bottles. The mechanism shown for applying glue to the carriers or pickers comprises a glue receptacle or tank 82 suitably mounted on the frame of the machine, and a gluing roller 83 from which the carriers receive glue before passing to the label magazines. Glue may be applied to the gluing roll 83 by any suitable means, such, for example, as an intermediate roll 84 which extends into the glue in the receptacle. The two rolls are driven by suitable gearing in such a manner that the peripheral speed of the roll 83 is substantially the same as the speed of the carriers, so as to prevent relative movement between the surface of the gluing roll and the carriers which would result in the scraping of a superfluous amount of glue from the gluing roll onto the carriers. This superfluous glue might flow from the carriers into the label magazines and interfere with the removal of the labels therefrom. The intermediate glue roll is mounted upon a shaft 85 having a pinion 86, Figs. 13 and 15, meshing with a gear 87 secured on or formed integral with the rotatable sleeve 57 on which the carrier supporting arms are mounted. The shaft 85 is suitably journaled on the glue tank 82 and is geared to the gluing roll 83 by any suitable means, such, for example, as a sprocket wheel 88 mounted on the shaft 85, Figs. 8 and 10, and connected by means of a chain 89 to a corresponding sprocket wheel 90 mounted on an idler shaft or stud 91. A gear 92 is secured on the idler shaft 91 and meshes with a gear 93 secured on a shaft 94 on which the gluing roll 83 is mounted. By means of the described construction, the glue rolls are positively driven and insure the proper gluing of the carriers. The ends of the shaft 94 of the gluing roll are journaled in arms 95 and 96, Figs. 13 and 15, pivoted on the shaft 85 and arranged at opposite sides of the glue tank. The idler shaft or stud 91 is also mounted on the arm 96, so that the gluing roll 83 and the idler gear 90 can be swung about the axis of the shaft 85 out of operative relation to the carriers. The arm 96 is provided with a rigid projection or part 97, and a spring 98 is connected at one end to the projection 97 and at its other end to a part of the glue tank and holds the glue roll 83 normally in operative relation to the carriers and permits the glue roll to be swung about the shaft 85 by the pickers. A stop arm 99 is pivoted on the projection 97 of the arm 96 and is provided with a pin 100 which engages the projection 97 and limits the swinging of the stop arm on its pivot in one direction. The stop arm is adapted to engage with a pin 102 of the glue tank to limit the movement of the glue roll 86 toward the path of movement of the carriers by the spring. The stop arm is provided with a notch 103 adapted to engage with the pin 102 to hold the glue roll 86 in its upper position in which it will not be engaged by the carriers. 104 represents a scraper for removing superfluous glue from the periphery and sides of the intermediate roll 84.

The glue tank, in the construction shown, is supported on studs 105 and 106 secured on a part or arm 107 of the bearing boss 55 and extending into holes in the base of the glue tank. One of the studs is provided with a nut for holding the tank in place on the studs and the tank and rolls mounted thereon can be readily removed from the machine by removing the nut and withdrawing the glue tank lengthwise of the stud so as to draw the pinion 86 out of mesh with gear 87. This permits the glue tank to be easily cleaned or replaced by another tank. Other means may be employed for mounting the glue tank on the machine.

The cam track 66 is provided adjacent to the gluing mechanism with a raised portion 110 which is so proportioned as to cause the surfaces of the carriers which are to be coated with glue to travel in a straight line during the time that they are in contact with the gluing roll 83. This insures the even distribution of the glue over the surfaces of the carriers which are to be glued.

When the carriers or pickers carry the labels into proximity to the bottles the labels are engaged by presser fingers traveling at the same velocity and in the same direction as the bottles and which hold the labels against the bottles while the carriers move away from the bottles, so that the labels are removed from the carriers. In the construction shown for this purpose a plurality of presser fingers 115 are mounted on a belt, chain, or the like, traveling parallel with the conveyer 30 and are adapted to be swung into and out of position to press a label on a bottle. Two chains 116 are preferably employed which are connected at intervals by strips or bars 117, and the upper runs of the chains are supported by bars or tracks 118 secured on extensions or brackets 119 of the frame of the machine. The bars 117 have upwardly projecting parts or lugs 120 at their opposite sides on which are pivoted plates 121 to which the presser fingers 115 are secured.

Figure 2:
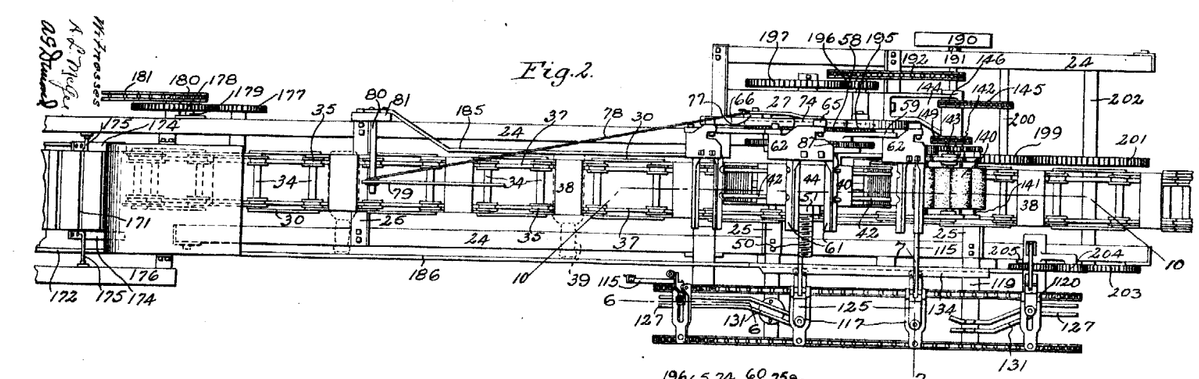
Fig. 2 is a top plan view thereof.
Figure 3:
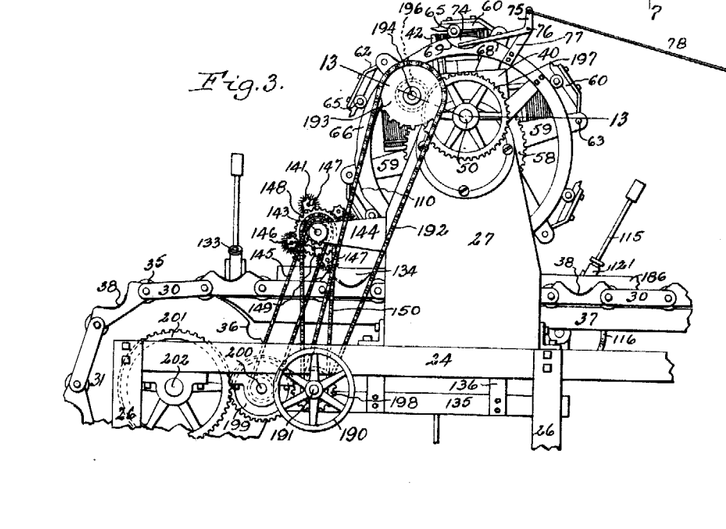
Fig. 3 is a fragmentary side elevation thereof, showing the side opposite to that shown in Fig. 1.
Figure 4:
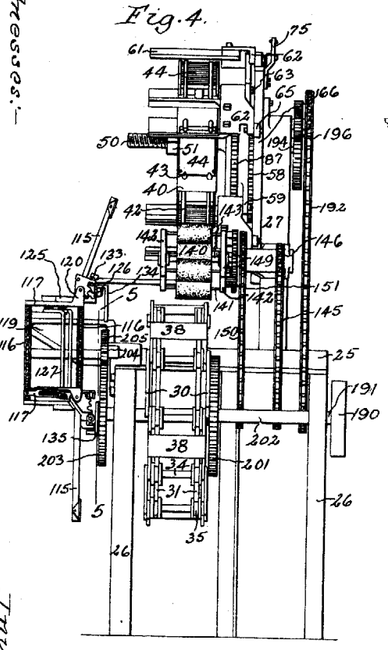
Fig. 4 is an end elevation thereof showing the discharge end of the machine.

In the construction shown, the presser fingers are normally in a substantially upright or vertical position and are adapted to be swung into an approximately horizontal position to press the labels on the bottles. In order to swing the plates 121 and the presser fingers 115 mounted thereon about their pivotal connections with the lugs 120 of the bars 117, rack bars 125 are slidably mounted on the plates 117 between the lugs 120, and the teeth of the rack bars mesh with gear teeth 126 on the plates 121. The rack bars are slidable lengthwise on the bars 117 by means of stationary cam tracks 127 suitably secured to the frame of the machine adjacent to the chains 116, and bolts or pins 128 extending through slots 129 in the plates 117 and having anti-friction rollers 130 mounted on the ends thereof, which engage with the cam tracks 127 during their movement along the lower run of the chains and a part of the upper run. The cam tracks are provided at one end with an oblique part 131, Fig. 2, which causes the presser fingers to move into engagement with the bottles and at the other end with a corresponding part for moving the presser fingers back into their inoperative positions.

Means are provided for holding the presser fingers in engagement with bottles after the presser fingers have been swung into engaging position by the cam tracks. For this purpose the plates 121 are each provided with a roller or wheel 133 adapted to engage the lower face of a track or substantially horizontal flange 134 which may be secured on the frame in any suitable manner. This track insures a secure holding of the fingers 115 on the bottles. After the labels have been secured to the bottles so that the holding of the labels is no longer necessary, the rollers 133 pass out of engagement with the track 134 and the presser fingers are swung back into their upright or inoperative positions as described. If desired, a track or guide strip 135 may be provided which is secured on the frame of the machine by means of brackets or supports 136 and with which the rollers 133 engage when in the vertical position on the lower run of the chain. Other means for removing the labels from the carriers and for holding the same on the bottles may be employed if desired.

Figure 16:
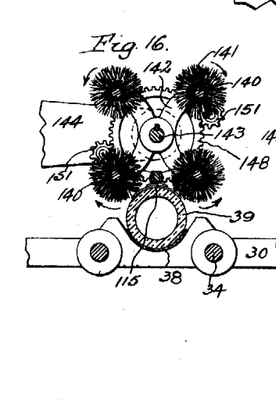
Fig. 16 is a fragmentary longitudinal sectional elevation of the machine showing the brushing mechanism for brushing or smoothing the labels on the articles.
Figure 17:
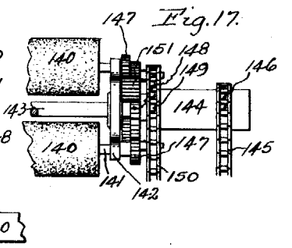
Fig. 17 is a transverse fragmentary end elevation of the brushing mechanism.

After the labels have been placed on the bottles and released from the carriers they are passed to brushes or analogous devices for pressing or smoothing out the labels on the bottles. In the construction shown for this purpose, see particularly Figs. 16 and 17, revolving brushes 140 are secured on shafts 141 rotatably mounted in the ends of arms 142 of a brush supporting frame or spider which is mounted on a shaft 143 suitably journaled on a bracket or arm 144 of the frame of the machine. The brush frame is rotated in such a manner that when a bottle passes under the same on the conveyer the bottle will enter between two of the revolving brushes which rotate in opposite directions to brush the label downwardly along the sides of the bottle. The brush supporting frame is rotated so that the brushes move about the axis of the brush frame supporting shaft 143 at substantially the same speed as the bottles on the conveyer so that two brushes move into engagement with each bottle passing along the conveyer and move out of engagement therewith when the label has been brushed out flat upon the surface of the bottle. The shaft 143 is rotated by means of a sprocket wheel 146 connected by means of a chain 145 to a suitable driving gear. The brushes are rotated about the axis of the shafts 141 by means of pinions 147 secured on the shafts 141 and engaging a gear 148 which is suitably mounted to rotate about the shaft 143. Movement is imparted to the gear 148 by means of a sprocket gear 149 engaging a chain 150, suitably driven, as will be hereinafter explained. In order to cause each of the pair of brushes engaging the label to rotate in opposite directions, the pinions 147 of alternate brushes are driven from the gear 148 by means of idler gears 151. By this arrangement the labels are pressed against the bottles while being held by the presser fingers 115, and since the brushes move with the bottles at substantially the same speed there is no tendency on the part of the brushes to change the position of the label or to tear the same.

Figures 18, 19, 20:
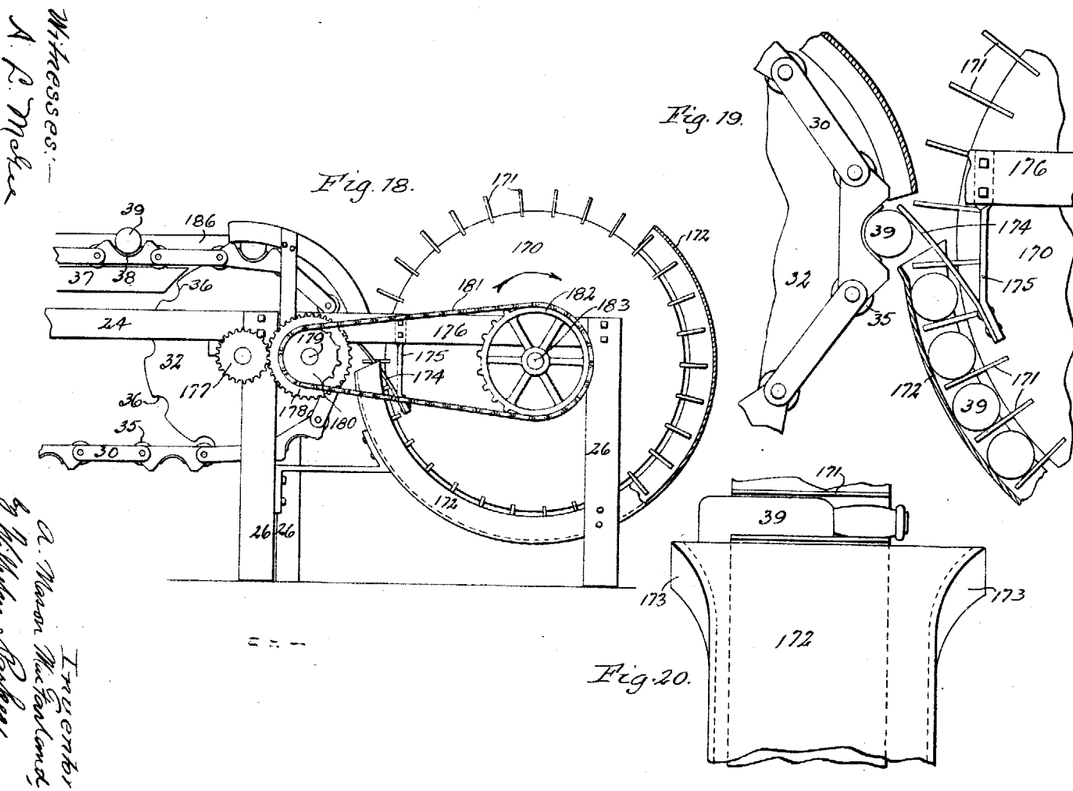
Fig. 18 is a side elevation of the feed end of the machine on the same scale as Fig. 1.
Fig. 19 is a fragmentary side elevation thereof, on an enlarged scale, showing parts of the guard broken away.
Fig. 20 is a fragmentary end elevation, on an enlarged scale, showing the bottle feed mechanism and guard for positioning the articles.

The labeling mechanism is so constructed that it can be operated at a high speed and consequently the bottle conveyer 30 travels so rapidly it is not possible to properly position the bottles thereon. For this reason means are provided for feeding the bottles to the conveyer and, in the construction shown, these means comprise a bottle carrier which travels at a lower rate of speed than the bottle conveyer so that the bottles can be placed by the attendant, and which positions the bottles on the conveyer. The bottle carrier shown for this purpose, see Figs. 18 and 19, consists of a feed wheel or member 170 having a plurality of outwardly extending fingers or partitions 171 between which the bottles can be placed. The bottles are placed in close proximity to each other on the bottle carrying wheel 170 while the bottles on the conveyer are spaced at considerable intervals. Consequently the bottle carrying wheel can be rotated at a much slower speed, thus giving the attendant ample time to place the bottles thereon. The bottle carrying wheel is so arranged that the bottles can be placed at the upper portion thereof and are then carried by the rotation of the wheel in the direction indicated by the arrow in Fig. 18, into a guide trough or shield 172 having flaring sides 173, as shown in Fig. 20, to aline the bottles. The other end of the trough terminates in close proximity to the receiving end of the bottle conveyer, and is so arranged relatively to the conveyer that the bottles are moved by means of a spring or guide 174 of any suitable construction from the bottle carrying wheel 170 to the pockets or cradles 38 of the bottle conveyer. This spring, as shown, is mounted on the bracket 175 secured to an extension 176 of the frame of the labeling machine. The bottle carrying wheel is rotated from a gear 177 which is secured to the shaft of the sprocket wheel 32 of the bottle conveyer, and which meshes with a gear 178 mounted on a countershaft 179. A sprocket wheel 180 also mounted on the countershaft 179 is connected by means of a chain 181 with a sprocket wheel 182 secured on a shaft 183 on which the bottle carrying wheel is mounted. The gears and the sprocket wheels are so proportioned that the periphery of the bottle carrying wheel will travel through a distance equal to one of the spaces thereon occupied by the bottles during the same time that the conveyer travels through a distance equal to that between the bottle cradles 38 thereon. Suitable means of any other construction may be employed for positioning the bottles on the conveyer.

If desired, means may be employed for keeping the bottles in alinement after they have been placed on the conveyer. The means shown for this purpose comprise two guard bars or rails 185 and 186, Fig. 2, which may be mounted in any suitable manner on the frame of the machine and which are arranged in operative relation to the ends of the bottles, thereby insuring the placing of the labels in the same relative position on each bottle. The top portion of the guard rail 186, in the structure shown, is turned over so as to form the track 134 for the presser fingers hereinbefore referred to.

Any suitable means may be employed for driving the various parts of the machine. In the construction shown, power is imparted to the machine from a motor or other suitable source of power, not shown, to a pulley or the like 190 mounted on a drive shaft 191 suitably journaled in the frame of the machine. The drive shaft 191 is provided with a sprocket wheel engaging a chain 192 which is connected with a sprocket wheel 193 secured on a shaft 194 journaled in the extension 27 of the frame of the machine. The shaft is provided with a pinion 195 engaging the gear 58 of the sleeve on which the label carriers are mounted. The shaft 194 also has a pinion 196 meshing with a gear 197 secured on the shaft 50 on which the label magazines are mounted. The drive shaft 191 is also provided with a sprocket wheel engaging the chain 150 which drives the gear 148 for rotating the brushes. A gear 198 on the drive shaft meshes with a gear 199 secured on a counter shaft 200 journaled in the frame of the machine. The shaft 200 has a sprocket wheel engaging the chain 145 for rotating the brush supporting frame 142. The gear 199 serves as an idler meshing with a gear 201 mounted upon a shaft 202 upon which the sprocket wheel 31 of the bottle conveyer is mounted, for operating the conveyer. The shaft 202 is provided at its other end with a gear 203, Figs. 2 and 5, meshing with an idler 204 through which a gear 205 is driven. This gear is mounted on a shaft 206 upon which one of the sets of sprocket wheels, which drives the sprocket chains 116 carrying the presser fingers 115, is mounted. The several gears and sprocket wheels mentioned are so proportioned as to drive the parts of the machine at such relative speeds to produce the proper coöperation between the various parts thereof.

In the embodiment of the invention shown in the drawings, the label magazine frame and the label pickers or carriers rotate about a central axis, but it will be understood that the invention is not limited to such structure, since the label magazines and the carriers could be mounted on other endless movable members without departing from the invention.

Label machines of the kind described require only a small amount of floor space and are adapted to operate at a high speed, so that the cost of labeling bottles is materially reduced by the use of this machine. The high speed at which the machine is capable of operating is due to a large extent to the fact that a plurality of label magazines are provided, with which a plurality of carriers engage successively and gradually move out of engagement therewith, so that the speed of operation of machines of this kind is increased without necessitating an increase in the speed at which the carriers approach and recede from the magazines.

I claim as my invention:

1. In a labeling machine, the combination of a conveyer on which the articles to be labeled are supported in a substantially horizontal position, a plurality of label magazines, and a plurality of devices movable in an endless path for taking labels from said magazines and placing the labels on the articles, said magazines and devices being arranged above the path of movement of said articles, and the magazines being arranged within the path of movement of said label taking devices.

2. In a labeling machine, the combination of a plurality of label magazines movable in an endless path, and a plurality of devices for taking labels from said magazines and carrying the same to the articles to be labeled, said devices being movable in an endless path, said magazines and devices moving in proximity to each other and in a common direction while said devices are taking the labels from the magazines, the path of movement of said magazines being arranged within the path of movement of said devices.

3. In a labeling machine, the combination of a plurality of label magazines, movable means for supporting said magazines, a plurality of label carriers adapted to take labels from said magazines, and movable means for supporting said carriers and adapted to move said carriers into and out of proximity to said magazines and at substantially the same velocity as said magazines for causing the carriers to take labels from said magazines, the path of movement of said magazines being arranged within the path of movement of said carriers.

4. In a labeling machine, the combination of a plurality of label magazines, a rotary support on which said magazines are mounted, a plurality of label carriers, and a rotary support on which said label carriers are mounted and which rotates eccentrically with regard to the magazine support, the paths of movement of the magazines and the carriers approaching each other and moving in substantially the same direction at the portions thereof during which the labels are taken from the magazines by the carriers.

5. In a labeling machine, the combination of a plurality of label magazines, a rotary support on which said magazines are mounted, a plurality of label carriers, and a rotary support on which said label carriers are mounted and which rotates eccentrically with regard to the magazine support, the axis of rotation of said label magazine support being within the circumference of said carrier support, and said supports being arranged to cause said label magazines and carriers to be moved into contact with each other for taking labels from the magazines.

6. In a labeling machine, the combination of a label magazine, a plurality of continuously movable label carriers adapted to take labels from said magazine and carry the same to the articles to be labeled, means for applying glue to said carriers, and continuously moving means for placing the articles to be labeled into operative relation to said carriers, said magazine, gluing means and articles being so arranged relatively to each other that different carriers may be simultaneously in operative relation to the gluing means, the label magazine and the articles.

7. In a labeling machine, the combination of a continuously moving conveyer adapted to carry a plurality of articles to be labeled, a plurality of label carriers, means for causing the carriers and articles to move together in substantially the same direction, and means adapted to engage the labels for transferring the labels from said carriers to said articles while the carriers and articles are moving together.

8. In a labeling machine, the combination of a continuously moving conveyer adapted to carry a plurality of articles to be labeled, a plurality of label carriers movable into proximity to and at substantially the same speed as the articles on said conveyer, and devices for engaging the labels while on said carriers and pressing the labels against the articles which move at substantially the same speed as said articles while in operative relation thereto.

9. In a labeling machine, the combination of a continuously moving conveyer adapted to carry a plurality of articles to be labeled, a plurality of label carriers movable into proximity to and at substantially the same speed as the articles on said conveyer, a plurality of rotary brushes for pressing the label against the article, and means for causing said brushes to move bodily at substantially the same velocity as said articles while in operative relation thereto.

10. In a labeling machine, the combination of a continuously moving conveyer adapted to carry a plurality of articles to be labeled, a plurality of label carriers movable into proximity to and at substantially the same speed as the articles on said conveyer, a plurality of rotary brushes for pressing the label against the article, and a revolving frame on which said rotary brushes are mounted, said frame being adapted to rotate to move the brushes into and out of operative relation to the articles and to move the brushes with the articles at substantially the same velocity as the articles when the brushes are in operative relation thereto.

11. In a labeling machine, the combination of a continuously moving conveyer adapted to carry a plurality of articles to be labeled, a plurality of label carriers movable in an endless path, a part of which extends into proximity to the conveyer, a plurality of label magazines movable in a continuous path which extends into proximity to the path of said carriers, whereby the carriers are adapted to take labels from said magazines, a gluing device in operative relation to the path of movement of said carriers and adapted to apply glue to the carriers before the same move into engagement with the label magazines, means for transferring labels from the carriers to the articles, and means movable in operative relation to the articles on the conveyer and at substantially the same velocity as said conveyer for pressing the labels on the articles.

12. In a labeling machine, the combination of a label magazine, a carrier adapted to take labels from the magazine, a conveyer for the articles, and means for smoothing the labels on the articles, all of said parts moving continuously and simultaneously and each of the parts moving in a single direction.

13. In a labeling machine, the combination of a plurality of label magazines, a plurality of carriers adapted to take labels from the magazines, a device for holding the labels on the articles, and means for brushing the labels on the articles, all of said parts moving simultaneously and each of said parts moving continuously in its path of movement.

14. In a labeling machine, the combination of a conveyer for the articles to be labeled, a plurality of movable label magazines, label carriers movable in proximity to and at substantially the same speed as said label magazines, a cam which guides said carriers and which has a depressed portion which causes the carriers to move into engagement with the labels in said magazine, a member which normally bridges said depressed portion to prevent the carrier from taking a label, and means actuated by the articles on the conveyer for moving said bridge member out of said depressed portion.

15. In a labeling machine, the combination of a conveyer for the articles to be labeled, a plurality of movable label magazines, label carriers movable in proximity to and at substantially the same speed as said label magazines, a cam which guides said carriers into operative relation to the magazines, a member normally in operative relation to the cam for preventing the carriers from taking labels from the magazines, and means arranged in operative relation to the conveyer and adapted to be actuated by the articles thereon to move said member out of operative relation to the cam.

16. In a labeling machine, the combination of a conveyer for the articles to be labeled, label carriers adapted to carry labels into proximity to said articles, members movable toward and from said conveyer and adapted to engage the labels held by said carriers and press the same into engagement with said articles, and means movable substantially parallel with and at the same speed as said conveyer, on which said members are mounted.

17. In a labeling machine, the combination of a conveyer for the articles to be labeled, label carriers adapted to carry labels into proximity to said articles, and endless belt movable substantially at the same speed and parallel with said conveyer, members mounted on said belt and adapted to be moved into engagement with the articles on the conveyer to hold labels thereon, and means engaging said members for moving the same toward and from said articles.

18. In a labeling machine, the combination of a conveyer for the articles to be labeled, label carriers adapted to carry labels into proximity to said articles, an endless belt movable substantially at the same speed and parallel with said conveyer, members mounted on said belt and adapted to be moved into engagement with the articles on the conveyer to hold labels thereon, and a cam track adapted to engage said members to move the same toward and from said articles.

19. In a labeling machine, the combination of a conveyer for the articles to be labeled, label carriers adapted to carry labels into proximity to said articles, an endless belt movable substantially at the same speed and parallel with said conveyer, presser fingers pivotally mounted on said belt and adapted to be moved into engagement with the articles on the conveyer to hold the labels thereon, and a cam track adapted to engage parts of said presser fingers for swinging the same about their pivots.

20. In a labeling machine, the combination of a conveyer for the articles to be labeled, means for applying a label to an article, brushes arranged in pairs and adapted to engage the opposite sides of the articles for pressing the labels on the articles, a frame on which the brushes are mounted, and means for continuously moving said frame to bring the brushes into operative relation to the articles.

21. In a labeling machine, the combination of a conveyer for the articles to be labeled, means for applying a label to an article, brushes arranged in pairs and adapted to engage the opposite sides of the articles for pressing the labels on the articles, means for rotating the brushes of each of said pairs in opposite directions, a frame on which the brushes are mounted, and means for moving said frame to bring the brushes into operative relation to the articles.

22. In a labeling machine, the combination of a conveyer for the articles to be labeled, means for applying a label to an article, brushes arranged in pairs and adapted to engage the opposite sides of the articles for pressing the labels on the articles, a frame on which the brushes are mounted, and means for rotating said frame to bring the brushes to a pair on opposite sides of an article while the article is being moved by the conveyer.

23. In a labeling machine, the combination of a conveyer for the articles to be labeled, means for applying a label to an article, brushes arranged in pairs and adapted to engage the opposite sides of the articles for pressing the labels on the articles, a frame having outwardly extending arms on which the brushes are rotatably mounted, a gear for rotating said brushes, pinions connected with said brushes and driven from said gear, and idler gears inserted between said gear and the pinions of one brush of each pair, whereby the brushes of each pair are rotated in opposite directions, and means for rotating said frame to bring said pairs of brushes into engagement with said articles.

24. In a labeling machine, the combination of a label magazine, a movable carrier adapted to take labels from said magazine, a gluing device comprising a receptacle for the glue, a gluing roll adapted to be engaged by said carrier, means for applying glue to said gluing roll, and an arm which is pivoted on said receptacle and on which said roll is journaled, said arm being adapted to be swung on its pivot to swing the gluing roll away from the path of movement of the carrier.

25. In a labeling machine, the combination of a label magazine, a movable carrier adapted to take labels from said magazine, a gluing device comprising a receptacle for the glue, a gluing roll adapted to be engaged by said carrier, means for applying glue to said gluing roll, an arm which is pivoted on said receptacle and on which said roll is journaled, said arm being adapted to be swung on its pivot to swing the gluing roll away from the path of movement of the carrier, and means for holding said arm in a position in which said gluing roll is out of the path of movement of the carrier.

26. In a labeling machine, the combination of a label magazine, a movable carrier adapted to take labels from said magazine, a gluing device comprising a receptacle for the glue, a gluing roll adapted to be engaged by said carrier and mounted on said receptacle, means on said receptacle for driving said gluing roll and including a pinion, a gear with which said pinion is adapted to engage, and means for removably supporting the glue receptacle on the machine to permit said pinion to be moved out of mesh with said gear.

27. In a labeling machine, the combination of a movable carrier, gluing mechanism past which said carrier moves and which has a roll for applying glue to the carrier, and a cam track which guides the carrier, and which has a portion in operative relation to the gluing device for causing the carrier to move in a direction parallel to the face thereof on which the glue is applied while said face is in engagement with said roll, whereby the gluing roll applies glue uniformly over said face of the carrier.

28. In a labeling machine, the combination of a carrier having a flat face adapted to receive glue, a rotatable frame on which said carrier is pivoted, a cam track for guiding the carrier in its movement, and gluing mechanism, including a gluing roll adapted to apply glue to said face of the carrier, said cam having a portion adapted to cause said carrier to move in a straight line parallel to said face thereof while said face is in engagement with said gluing roll.

29. In a labeling machine, the combination of a support for the articles to be labeled, a carrier adapted to carry labels into operative relation to the articles, a label magazine mounted on a frame adapted to turn about a substantially horizontal axis, said carrier taking labels from said magazine when the discharge end of the magazine faces upwardly, a follower in said magazine adapted to feed the labels toward the discharge end of the magazine when the same is positioned with its discharge end facing downwardly, and means for preventing the follower from moving toward the inner end of the magazine.

30. In a labeling machine, the combination of a support for the articles to be labeled, a carrier adapted to carry labels into operative relation to the articles, a plurality of label magazines adapted to rotate about a substantially horizontal axis, gravity-actuated followers in said magazines adapted to feed the labels to the outer ends of the magazines when the magazines are positioned with their open ends facing downwardly, said carrier taking the labels from said magazines when the discharge portions of said magazines have been moved from their downward positions, and pawl and ratchet mechanisms for holding the followers against moving toward the inner portions of the magazines.

31. In a labeling machine, the combination of a support for the articles to be labeled, a plurality of label magazines, a frame having a rim portion on which said magazines are mounted, said frame being rotatable about a substantially horizontal axis, a carrier adapted to take labels from said magazines when the discharge ends thereof face upwardly and to carry labels into operative relation to the articles, followers in said magazines, rack bars secured on said followers and extending through holes in said rim, and pawls engaging said rack bars and mounted within said rim, whereby the labels are fed outwardly in the magazines by gravity and centrifugal action and are held in their outer positions.

32. In a labeling machine, the combination of a support for the articles to be labeled, a label magazine, label carriers adapted to take labels from said magazine and carry the same into operative relation to said articles, a support for the carriers which moves said carriers in an endless path and on which said carriers are pivotally mounted, and a cam track with which said carriers engage and which has a portion which causes the carriers to swing about their pivots into operative relation to the magazine.

33. In a labeling machine, the combination of a support for the articles to be labeled, a label magazine, label carriers each comprising a part adapted to take labels from said magazine and an arm extending outwardly from said part, a movable support on which the arms of the label carriers are pivoted, a cam track with which said carriers engage, and means for yieldingly pressing said carriers into engagement with the cam track.

34. In a labeling machine, the combination with a plurality of label magazines, a plurality of label carriers adapted to take labels from the magazines, a rotary frame on which said label magazines are supported, a frame on which said carriers are mounted, a bearing boss on which said carrier frame is rotatably mounted, and a shaft for said magazine frame arranged eccentrically in said boss.

Witness my hand, this 10th day of May, 1915.

A. MASON MacFARLAND.

Witnesses:
F. E. PROCHNOW,
A. L. McGEE.

Copies of this patent may be obtained for five cents each, by addressing the "Commissioner of Patents, Washington, D. C."

It is hereby certified that in Letters Patent No. 1,294,290, granted February 11, 1919, upon the application of Allison Mason MacFarland, of Buffalo, New York, for an improvement in "Labeling-Machines," errors appear in the printed specification requiring correction as follows: Page 2, line 55, for the words "not shown in" read *that shown in the;* page 3, line 102, for the word "not" read *no;* and that the said Letters Patent should be read with these corrections therein that the same may conform to the record of the case in the Patent Office.

Signed and sealed this 25th day of March, A. D., 1919.

[SEAL.]

R. F. WHITEHEAD,
*Acting Commissioner of Patents.*

Cl. 216—54.